Patented Oct. 4, 1938

2,131,790

UNITED STATES PATENT OFFICE 2,131,790

PICKLING INHIBITOR

William P. ter Horst, Packanack Lake, N. J., assignor to United States Rubber Products, Inc., New York, N. Y., a corporation of Delaware No Drawing. Application January 29, 1938, Serial No. 187,679

16 Claims. (Cl. 148—8)

This invention relates to the treatment of metallic surfaces where the surface is subjected to the action of liquids of an acid nature. More particularly, the invention relates to the prevention of excessive pitting, embrittlement, and undesirable dissolution of metal during contact with an acidic liquid. The invention also provides a pickling bath containing a new class of inhibitors; particularly for the pickling of such as iron and steel.

It has been found that chemicals containing the thiopyrimidine ring possess valuable inhibiting properties, that is, when added to a pickling bath they greatly retard the attack of the acid on such as iron and steel without materially influencing the attack of the acid material on scale or rust. Typical of these inhibitors are those designated as follows: 2-mercapto tetrahydro pyrimidine (M. P. 203–204° C.), 2-mercapto-5-methyl tetrahydro pyrimidine (M. P. 217–219° C.), 2-mercapto-4,6,6-trimethyl dihydro pyrimidine (M. P. 249–250° C.), 2-mercapto-4,6-diethyl-6-methyl dihydro pyrimidine (M. P. 228–230° C.).

The mercapto alkyl dihydropyrimidines may be formed by the interaction of two moles of aliphatic ketone or the equivalent thereof, with one mole of ammonium thiocyanate or with one mole of thiourea or a mono-substituted thiourea, at temperatures ranging from room temperature up to about 150° C., the preferred bodies being those prepared by the use of acetone or methyl ethyl ketone. By the "equivalent" of two moles of aliphatic ketone I refer to the use of one mole of a condensed ketone, such as an alkylidene ketone, which may be formed by the condensation of one mole of a simple ketone with one or two moles of the same or a different ketone or of an aldehyde. The reactions by which the mercapto alkyl dihydro pyrimidines are formed are advantageously carried out in the presence of an excess of the ketone.

The tetrahydro pyrimidines may be prepared by the reaction of carbon disulphide on aliphatic 1,3 diamines; e. g. 2-mercapto-5-methyl tetrahydro pyrimidine may be prepared as follows: 10 grams carbon disulphide are slowly added to a solution of 10 grams 1-3 diamino isobutane in 100 cc. water. After evaporating to dryness and recrystallizing from chloroform, 10 grams of a white powder (M. P. 217–219° C.) are obtained.

The products are usually crystalline solids. It is possible that these compounds may also undergo tautomerism, and the tautomeric forms of any given compound are to be considered equivalents of each other for the purposes of the present invention.

The tetrahydro mercapto bodies are believed to contain the nucleus

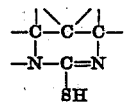

and the dihydro mercapto bodies are believed to contain the nucleus

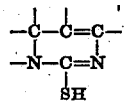

in which the neighboring C atoms have hydrogen or alkyl groups as substituents, and one of the N atoms has hydrogen or alkyl or aryl as a substituent.

In further illustration of the expanse of the invention, other ketones may be used for the reaction in preparation of the mercapto pyrimidines, particularly the dihydro pyrimidines,—for example diethyl ketone, dipropyl ketone, methyl propyl ketone, diacetone alcohol, mesityl oxide, methyl isopropyl ketone, methyl butyl ketone, methyl isobutyl ketone, acetyl acetone, methyl amyl ketone, diacetone amine, ethylidene acetone, methyl hexyl ketone, mono-hydroxy acetone, di-hydroxy acetone, methyl beta-hydroxyethyl ketone, methyl gamma-hydroxy-propyl-ketone, etc. In many instances the ammonium thiocyanate may be replaced by thiourea or by a mono-substituted thiourea, such as methyl thiourea, ethyl thiourea, or phenyl thiourea. Also for the broad purpose of the invention various derivatives of the above mercapto bodies may be used, namely the aldehyde and sulphur derivatives, as well as the oxidized or reduced thiopyrimidines.

Accordingly the invention broadly comprises incorporating in a usual pickling bath,—which may or may not contain any of the known inhibitors,—one or more of the herein referred to products of which the mercapto dihydro pyrimidines are a preferred class. If desired, a wetting agent may be added to improve the inhibiting properties. When such as iron or steel is placed and kept therein for a suitable length of time at a suitable temperature, the metal is freed from scale and rust and after removal presents a smooth surface which can then be coated in the customary way with any protective or ornamental coating.

The following data illustrate the effectiveness of the new inhibitors:

Pieces of hot rolled, low carbon steel such as are generally used for tin plating, 3" x 4", 30-gauge were cleaned and weighed. After pickling during a certain length of time in 750 cc. 6% $H_2SO_4$ with and without the various inhibitors, at 180° F., the weights were redetermined. The lower the loss in weight, the better the inhibitor.

| | Loss in weight in mg. after pickling | | |
|---|---|---|---|
| | 20 min. | 30 min. | 60 min. |
| 1. Blank; no inhibitor | 7,878 | | |
| 2. Acid containing 25 mg. of the reaction product of methyl ethyl ketone and ammonium thiocyanate, (M. P. 229–230° C.) | | 280 | |
| 3. Acid containing 25 mg. of the reaction product of methyl ethyl ketone and ammonium thiocyanate, (M. P. 229–230° C.) plus 5% "Wetanol" | | 35 | 66 |
| 4. Acid containing 160 mg. of the reaction product of acetonyl acetone and ammonium thiocyanate (purple powder M. P. 170–177° C.) | 110 | | |
| 5. Acid containing 25 mg. of the reaction product of acetone and ammonium thiocyanate mixed with 5% "Wetanol" | 145 | | |
| 6. Acid containing 25 mg. of 2-mercapto-5-methyl-tetrahydro-pyrimidine, M. P. 217–219° C., mixed with 5% "Wetanol" | 347 | | |
| 7. Acid containing 25 mg. of 2-mercapto-tetrahydro pyrimidine, M. P. 203–204° C., mixed with 5% "Wetanol" | 944 | | |

The methyl ethyl ketone-ammonium thiocyanate product may be prepared as follows: 250 grams ammonium thiocyanate and 500 grams methyl ethyl ketone are heated on a steam bath under reflux during 24 hours. The unreacted methyl ethyl ketone is removed by distillation. To the residue are added 1000 grams of water. The water-insoluble material is isolated by filtration. The yield is 143 grams of light-colored powder.

Similar results may be obtained with (a) acetone-ammonium thiocyanate product, which is identical with (b) the mesityl oxide-ammonium thiocyanate product and with (c) the mesityl oxide-thiourea product, which may be prepared variously as follows:

(a) 450 grams ammonium thiocyanate and 1300 grams of acetone are heated under reflux on a steam bath during 84 hours. The temperature of the liquid is approximately 70° C. The unreacted acetone is distilled off. To the residue, water is added and the water-insoluble crystalline material is filtered off. The yield is 18 grams of what is believed to be 2-mercapto-4,6,6-trimethyl dihydro pyrimidine, (melting at 249–250° C. after re-crystallization from alcohol or methyl ethyl ketone.

(b) 18 grams ammonium thiocyanate and 25 grams mesityl oxide are heated during 8 hours at 150° C. The contents of the reaction vessel are poured into water and the water insoluble material is filtered off. The yield is 23 grams of reaction product.

(c) 985 grams thiourea and 1300 grams mesityl oxide are heated under reflux during 24 hours. The unreacted mesityl oxide is removed by distillation. The residue is treated with water to remove unreacted thiourea. The crude water-insoluble material amounts to about 244 grams (M. P. 233–234° C.). By recrystallizing the melting point may be raised to 249–250° C.

Wetanol is a wetting agent believed to be of the sulfated alcohol type; other wetting agents may be used instead, for example those obtained from sulfite pulp liquors, e. g. lignin sulfonates, etc.

In preparing the thio-pyrimidines, the time and temperature of the reaction and the amount of reactants may be varied, as is found suitable. Also a catalyst may or may not be used as desired, to regulate the reaction. The inhibitors may be used as such or mixed with other chemicals. Also the thiopyrimidines of this invention may be made by any of the methods known to the art.

Instead of using single acids, a mixture of acids may be used, for example, a mixture of hydrochloric and sulphuric acids, in the pickling operation.

The chemicals disclosed herein may be used in the pickling of steel, in acids used for cleaning equipment, or metal articles in general, in acid solutions to be circulated or distributed through metallic piping systems, in acid reaction mixtures in order to protect chemical reaction vessels, or in hydrochloric acid used in the mining industries. Furthermore, the inhibitors may be added to concentrated acid solutions without undergoing any substantial impairment of their inhibiting power.

With the detailed description given above, it will be clear various changes may be made without departing from the principle of the invention, for instance the bath need not necessarily be what is known as a pickling bath but may be used in connection with any condition where metal would be attacked by acid liquids, and the invention is not to be limited except as indicated in the appended claims.

Having thus described my invention, what I claim and desire to protect by Letters Patent is:

1. A process of protecting a metal surface such as iron, steel or the like against undesirable dissolution by an acid solution in contact therewith which comprises adding to said acid solution a mercapto pyrimidine compound.

2. A process of protecting a metal surface such as iron, steel or the like against undesirable dissolution by an acid solution in contact therewith which comprises adding to said acid solution an alkyl-substituted mercapto pyrimidine.

3. A process of protecting a metal surface such as iron, steel or the like against undesirable dissolution by acids which comprises treating the metal with an acid solution containing an alkyl-substituted dihydro mercapto pyrimidine.

4. A process of protecting a metal surface such as iron, steel or the like against undesirable dissolution by acids which comprises treating the metal with an acid solution containing a 2-mercapto-4,6,6-trialkyl dihydro pyrimidine.

5. A process of protecting a metal surface such as iron, steel or the like against undesirable dissolution by an acid solution in contact therewith which comprises adding to said acid solution a product obtainable by the reaction of carbon disulphide with an aliphatic 1,3 diamine.

6. A process of protecting a metal surface such as iron, steel or the like against undesirable dissolution by acids which comprises treating the metal with an acid solution containing alkyl-substituted tetrahydro mercapto pyrimidine.

7. A process of protecting a metal surface such as iron, steel or the like against undesirable dissolution by an acid solution in contact therewith, which comprises adding to said acid solution a product obtainable by the reaction of an aliphatic ketone with ammonium thiocyanate.

8. A process of protecting a metal surface such as iron, steel or the like against undesirable dissolution by an acid solution in contact therewith, which comprises adding to said acid solution a product obtainable by the reaction of a dialkyl ketone compound with ammonium thiocyanate.

9. A process of protecting a metal surface such as iron, steel or the like against undesirable dissolution by an acid solution in contact therewith, which comprises adding to said acid solution a product obtainable by the reaction of methyl ethyl ketone and ammonium thiocyanate.

10. A process of protecting a metal surface such as iron, steel or the like against undesirable dissolution by an acid solution in contact therewith, which comprises adding to said acid solution a product obtainable by the reaction of acetone and ammonium thiocyanate.

11. A pickling bath for iron and steel products comprising a pickling acid and a mercapto pyrimidine compound.

12. A pickling bath for iron and steel products comprising a pickling acid and a product obtainable by the reaction of an aliphatic ketone with ammonium thiocyanate.

13. A pickling bath for iron and steel products comprising a pickling acid and a product obtainable by the reaction of acetone with ammonium thiocyanate.

14. A process of protecting a metal surface such as iron, steel or the like against undesirable dissolution by an acid solution in contact therewith which comprises adding to said acid solution a product obtainable by the reaction of an aliphatic ketone with a thiourea.

15. A pickling bath for iron and steel products comprising a pickling acid and a product obtainable by the reaction of carbon disulphide with an aliphatic 1,3 diamine.

16. A pickling bath for iron and steel products comprising a pickling acid and a product obtainable by the reaction of an aliphatic ketone with a thiourea.

WILLIAM P. TER HORST.